E. W. SNYDER & J. D. CRAWFORD.
APPARATUS FOR TREATING THE OCOTILLO PLANT FOR EXTRACTING GUM THEREFROM.
APPLICATION FILED DEC. 16, 1916.
1,240,894.  Patented Sept. 25, 1917.
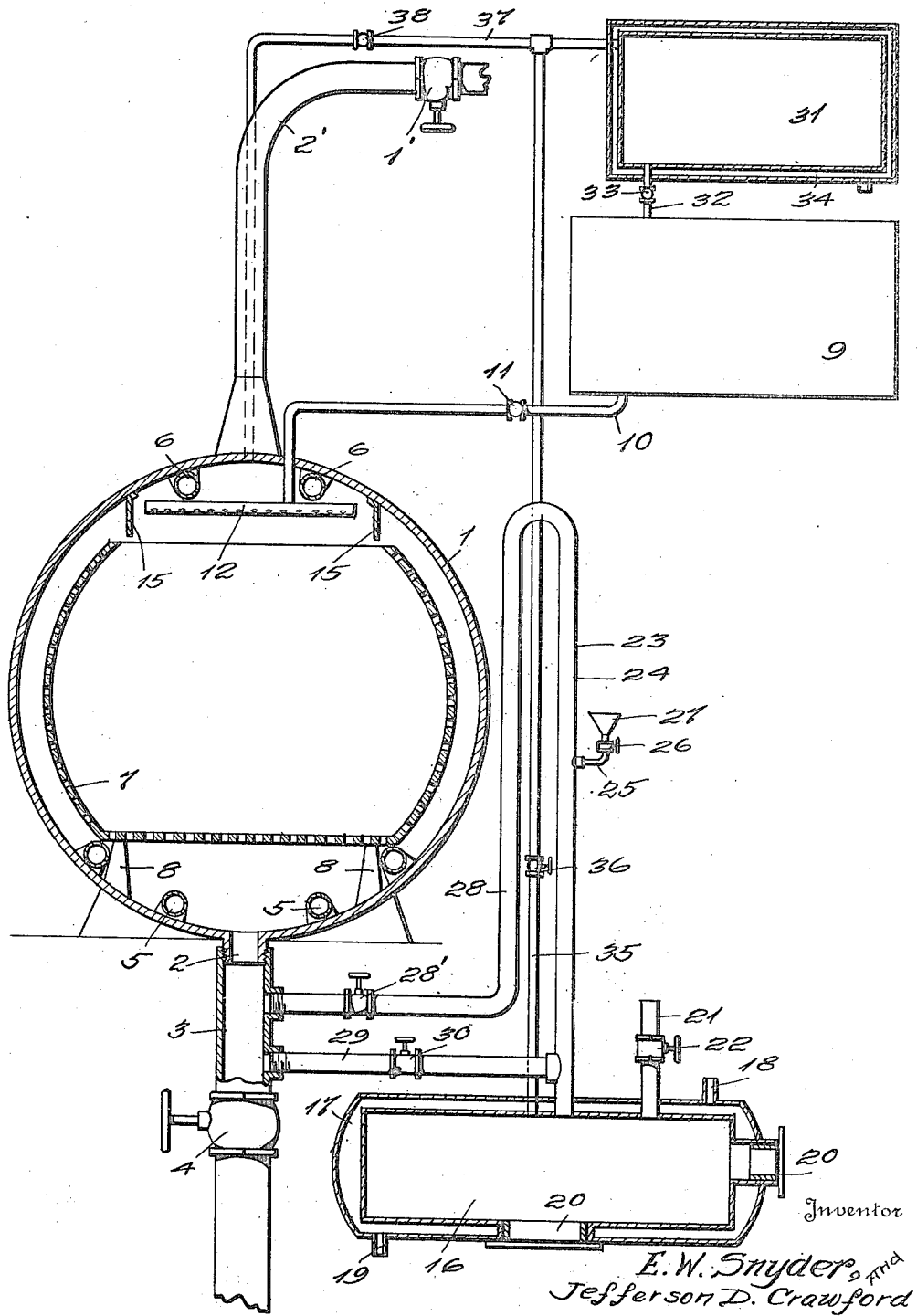
Inventor
E. W. Snyder, and
Jefferson D. Crawford
By C. L. Parker
Attorney

UNITED STATES PATENT OFFICE.

EDGAR W. SNYDER, OF LOS ANGELES, AND JEFFERSON DAVIS CRAWFORD, OF SAN FRANCISCO, CALIFORNIA; SAID CRAWFORD ASSIGNOR TO SAID SNYDER.

APPARATUS FOR TREATING THE OCOTILLO-PLANT FOR EXTRACTING GUM THEREFROM.

1,240,894.  Specification of Letters Patent.  Patented Sept. 25, 1917.

Application filed December 16, 1916. Serial No. 137,401.

*To all whom it may concern:*

Be it known that we, EDGAR W. SNYDER and JEFFERSON DAVIS CRAWFORD, citizens of the United States, residing at Los Angeles and San Francisco, in the county of Los Angeles and San Francisco and State of California, have invented certain new and useful Improvements in Apparatus for Treating the Ocotillo-Plant for Extracting Gum Therefrom, of which the following is a specification.

Our invention relates to apparatus for and process of treating the ocotillo plant (*Fouquiera splendens*).

As is well known, the ocotillo plant (*Fouquiera splendens*), grows in considerable abundance in northern Mexico and along the Rio Grande. It has been found that the ocotillo plant contains water, vegetable fiber and a gum. This gum ordinarily constitutes from twelve to eighteen per cent. by weight of the total plant. It is well known that this gum may be extracted from the ocotillo plant by the use of proper solvents and subsequently separated from the solvent, preferably by distillation. The reclaimed gum has a great many important uses, such as a constituent of chewing gum, constituent of shellac or varnish, and may also be used as an adhesive gum in the manufacture of hose, belts, etc.

An important object of the invention is to provide means for extracting the gum in commercial quantities, in an economical and profitable manner.

Other objects and advantages of the invention will be apparent during the course of the following description.

In the accompanying drawings forming a part of this specification and in which like numerals are employed to designate like parts throughout the same, The figure is a partly diagrammatic side elevation of apparatus embodying the invention, parts being shown in section for the purpose of illustration.

In the drawings, wherein for the purpose of illustration is shown a preferred embodiment of our invention, the numeral 1 designates a preferably cylindrical digester, which is shown as horizontally arranged, while it is to be understood that the same may be vertically disposed, if desired. One end of this digester is formed open, for access to the interior thereof, and such end is covered by a movable door (not shown). A pipe 2' is connected with the digester, has a cut off valve, and is adapted for connection with a vacuum pump. This digester is provided in its lower portion with a relatively large outlet coupling or nipple 2, having connection with a downwardly discharging waste pipe 3, provided with a cut off valve 4, as shown. The digester 1 is preferably heated by means of steam coils 5, arranged within the lower portion thereof, and having suitable means of communication with a source of steam, the interior of these pipes having no communication with the interior of the digester. Arranged in the upper portion of the digester 1 are cooling or condensing coils 6, having communication with a suitable source of cooling fluid, and the interior of these cooling coils have no communication with the interior of the digester 1.

Arranged within the digester 1 is a material holding member or container 7, preferably formed of perforated sheet metal. The bottom of this member is supported by uprights 8, attached to the digester 1.

A liquid solvent holding storage tank 9 is arranged suitably above the digester 1 and has connection with an outlet pipe 10, equipped with a cut off valve 11. The pipe 10 leads into the upper portion of the digester 1 and is therein connected with a perforated spray 12, arranged in the upper portion of the digester, above and in proximity to the upper open end of the member or container 7.

Arranged upon opposite sides of the cooling pipes or members 6 are baffle plates 15, attached to the digester by any suitable means. The function of these baffle plates is to retard the passage of the vaporized solvent causing it to condense in the upper cooled portion of the digester, and travel downwardly upon the inner surface of the digester.

The numeral 16 designates a separator tank, arranged beneath the digester 1 and provided with heating means, in the form of a steam jacket 17. Steam may be supplied into the jacket 17 through a steam inlet pipe 18 and the water which may condense in the jacket escapes through an outlet pipe 19. The tank 16 is equipped with suitable manholes 20, having covers, as shown. A vacuum pipe 21 is connected with the tank 16 and leads to a vacuum pump (not shown). The pipe 21 has a cut off valve 22 connected therewith.

The numeral 23 designates a siphon, one arm 24 of which leads into the tank 16. This arm is equipped with a pipe 25, having a cut-off valve 26 and a funnel 27, as shown. The pipe 25 is provided so that a liquid, such as alcohol, may be added to the solvent during the practice of the process. The other arm 28 of the siphon is connected with the waste conduit 3 and has a cut-off valve 28', as shown. A branch pipe 29 is connected with the conduit 3 and with the arm 24, as shown. The pipe 29 has a cut-off valve 30.

Arranged above the solvent storage tank 9 is a condenser 31, equipped with an outlet pipe 32, having a cut-off valve 33. The outlet pipe 32 discharges into the storage tank 9. Surrounding the condenser 31 is a cooling jacket 34, through which may be circulated water or any other suitable cooling fluid.

The numeral 35 designates a pipe leading into the upper portion of the tank 16 and having a cut-off valve 36. This pipe is connected at its upper end with a pipe 37. One end of the pipe 37 leads into the condenser 31 while its opposite end leads into the upper portion of the digester 1. The pipe 37 is provided with a cut-off valve 38, as shown.

In the operation of the apparatus during the practice of our process, the liquid solvent of the gum is placed in the storage tank 9. The ocotillo plant, which may be suitably cut up or divided is introduced into the container 7 and the digester 1 is closed. The valve 11 is opened and remains open during the extracting process. The liquid solvent will then pass from the storage tank 9 through pipe 10 and through the sprinkler 12. The solvent is thus sprayed upon the ocotillo plant. About this time, steam is supplied to the heating pipes 5, while a cooling medium is supplied to the pipes 6. By this means the lower portion of the digester 1 has a high temperature while the upper portion has a relatively low temperature. In the digester 1, the ocotillo plant is therefore subjected to the action of the solvent in the presence of heat and under suitable pressure. The solvent with the gum in solution therein, passes through the perforated container 7 and accumulates in the digester. During this operation, the solvent being volatile, will vaporize more or less and this vapor passes, to considerable extent, upwardly exteriorly of the member 7. Upon approaching the cooling coils 6, the greater portion of this vapor becomes condensed and the baffle plates 15 serve to check the travel of the condensed vapors, causing the same to descend upon the inner sides of the digester 1. The portions of the vaporized solvent which pass to the upper portion of the digester 1 without being condensed, escape through the pipe 37 (valve 38 being open), and pass into the condenser 31, and are therein condensed and returned to the storage tank 9, to be again supplied to the digester. During this operation the valve 28' is open and the valve 30, closed. As the operation continues, the level of the liquid solvent containing the gum in solution therein, rises within the digester, and as this level rises the liquid also rises in the arm 28 of the siphon. When the level of the liquid in the arm 28 rises sufficiently so that the same flows into the arm 24, the siphon 23 is set into action, and the liquid is withdrawn from the digester 1 and discharged into the receiving tank 16. If desired, the siphon 23 may be thrown out of action by closing the valve 28', and the valve 30 may be opened at the proper time to discharge the liquid from the digester into the receiving tank 16. The siphon, however, is preferred as its operation is automatic. In the receiving tank 16, the volatile solvent is separated from the reclaimed gum, which is accomplished by subjecting the mixture to heat. This heat may be obtained by supplying steam into the steam jacket. The volatilized solvent passes upwardly through the pipe 35 into the pipe 37, and then into the condenser 31. From the condenser the condensed solvent passes into the storage tank 9, and is retained therein until it is desired to again use the same, the valve 11 being closed.

After this operation, if it is desired to further recover the solvent from the fibrous material within the digester 1, the digester is closed by closing the various valves associated therewith and the valve in the vacuum pipe 21 is open. The vacuum pump is set into operation, and a substantial vacuum created within the digester, while steam is supplied to the heating tubes 5. By this means the remaining volatile solvent will volatilize, and be withdrawn from the digester and suitably recovered. In a similar manner, the vacuum pump connected to the pipe 21 may be set into action and the valve 22 opened, while the tank 16 is otherwise closed. Steam is introduced into the jacket 17 and the mass therein is heated so that the remaining solvent is volatilized and passes through the pipe 21 to be suitably recovered.

The fine particles of the digested fiber of the plant, which pass through the bottom of the member 7 may be withdrawn through the pipe 3, by opening the valve 4.

We have found that it is necessary to somewhat modify the steps of the process, depending upon the character of the gum, which it is desired to recover, and upon the use to which it is to b put.

If the reclaimed gum is to be employed as a constituent of chewing gum, the solvent introduced into the tank 9 would be alcohol, or a compound of alcohol with milk of lime or magnesia. We have found it advantageous in obtaining gum for other purposes to use different solvents, such as benzin, gasolene, naphthol, ether, turpentine, acetone, toulol, and xylol or a combination of these solvents with other solvents.

We have found that by first subjecting the ocotillo plant, to the action of a dilute solution of an acid, such as hydrochloric, sulfuric, acetic, or lactic, acid, etc., and then subjecting the same to the action of a solvent of the gum, such as alcohol, in the presence of pressure and heat beneath the boiling point or to about 700° F., that the reclaimed gum is found to be very adhesive. This adhesive gum is valuable and may be employed in the manufacture of hose or the like. We have also found that an alkali, such as lime, magnesia, borax, sodium carbonate, or the like, may be substituted for the acid and the gum treated as indicated, will be highly adhesive and may be advantageously employed in the manufacture of hose belting or the like. We preferably add about 25 per cent. to 50 per cent. of the alkali by weight with relation to the ocotillo plant being treated.

It is to be understood that the form of our invention herewith shown and described is to be taken as a preferred example of the same and that various changes may be resorted to without departing from the spirit of the invention or the scope of the subjoined claims.

Having thus described our invention, we claim:

1. In apparatus of the character described, the combination with a digester, of a foraminous container arranged therein for receiving and holding the ocotillo plant containing a gum, means to heat the lower portion of the digester, baffle plates connected with the upper portion of the digester in proximity to and inwardly of the side walls of the container, means arranged inwardly of the baffle plates to spray a liquid solvent of the gum into the container, and means for withdrawing the solvent containing the gum in solution therein from the digester.

2. In apparatus of the character described, the combination with a digester, of a foraminous container arranged therein for receiving and holding the ocotillo plant containing a gum, means to heat the lower portion of the digester, cooling means arranged within the upper portion of the digester, baffle plates connected with the upper portion of the digester in proximity to the cooling means, and arranged inwardly of the sides of the container, means to spray a liquid solvent of the gum into the foraminous container, and means for withdrawing the solvent containing the gum in solution therein from the digester.

3. In apparatus of the character described, the combination with a digester, of a container arranged therein for receiving and holding ocotillo plant containing gum and having its top open and its sides perforated, means to heat the digester, cooling means arranged within the upper portion of the digester near and above the open end of the perforated container, baffle plates connected with the upper portion of the digester and arranged outwardly of the cooling means and inwardly of the upper open end of the container for directing condensation to the interior of the container, means disposed near and above the upper open end of the container for spraying a liquid solvent therein, and means for withdrawing the solvent containing the gum in solution therein from the lower portion of the digester.

4. In apparatus of the character described, the combination with a digester, of a container arranged therein for receiving and holding the ocotillo plant containing gum and having its top open and its sides and bottom perforated with the bottom and top thereof spaced a substantial distance from the lower and upper portions of the digester, means arranged within the lower portion of the digester and beneath the perforated container for heating the digester, cooling means arranged within the upper portion of the digester near and above and inwardly of the upper open end of the container for acting upon gases passing from the container, substantially vertical baffle plates secured to the upper portion of the digester and depending therefrom near and above the upper open end of the container and arranged within such upper open end to direct condensation back to the interior of the container, and means located beneath the cooling means and near and above the open end of the container for introducing a liquid solvent of the gum into the upper portion of the container.

In testimony whereof we affix our signatures in presence of two witnesses.

EDGAR W. SNYDER.
JEFFERSON DAVIS CRAWFORD.

Witnesses:
CHAS. F. JENKINS,
MARGARET MARQUARD.

Copies of this patent may be obtained for five cents each, by addressing the "Commissioner of Patents, Washington, D. C."